United States Patent [19]

Steinmann et al.

[11] Patent Number: 5,177,159

[45] Date of Patent: Jan. 5, 1993

[54] POLYHYDROXY ESTERS CONTAINING CARBOXYL END GROUPS AND THEIR USE

[75] Inventors: Bettina Steinmann, Praroman; Wolfgang Seiz, Pfeffingen, both of Switzerland

[73] Assignee: Ciba-Geigy Corporation, Ardsley, N.Y.

[21] Appl. No.: 566,946

[22] Filed: Aug. 14, 1990

[30] Foreign Application Priority Data

Aug. 23, 1989 [CH] Switzerland .................... 3052/89

[51] Int. Cl.$^5$ ............................................. C08G 59/14
[52] U.S. Cl. ............................................. 525/438; 525/533; 525/530; 528/112
[58] Field of Search ................. 525/438, 533, 530; 528/112

[56] References Cited

U.S. PATENT DOCUMENTS

| | | | |
|---|---|---|---|
| 2,651,589 | 10/1949 | Shokel | 154/140 |
| 2,890,204 | 6/1959 | Delmonte | 260/47 |
| 3,256,226 | 6/1966 | Fekets et al. | 260/23.5 |
| 3,397,254 | 8/1968 | Wynstra et al. | 260/835 |
| 3,535,289 | 10/1970 | Kata et al. | 260/78.4 |
| 3,639,655 | 2/1972 | Jones | 260/47 C |
| 4,147,737 | 4/1979 | Sein et al. | 260/835 |
| 4,175,173 | 11/1979 | Bagga et al. | 528/97 |
| 4,304,804 | 12/1981 | Fitkee | 428/35 |
| 4,424,313 | 1/1984 | Meyer et al. | 525/438 |
| 4,430,479 | 2/1984 | Merten et al. | 525/127 |
| 4,528,341 | 7/1985 | Belder et al. | 525/438 |
| 4,740,580 | 4/1988 | Merck et al. | 525/438 |
| 5,006,612 | 4/1991 | Danick et al. | 525/438 |

OTHER PUBLICATIONS

Makramal. Chem. vol. 186 p. 2025 (1985).
J. Polym. Sci. A-1 vol. 7 p. 2117 (1969).
Chem. Abstract 20:114957s.

*Primary Examiner*—Melvyn I. Marquis
*Assistant Examiner*—Randy Gulakowski
*Attorney, Agent, or Firm*—JoAnn Villamizar; William A. Teoli, Jr.

[57] ABSTRACT

Curable compositions of matter containing
(a) an epoxy resin and
(b) a polyhydroxy ester containing carboxyl end groups which is obtainable by reaction of a diepoxide with a dicarboxylic acid in the presence of a basic catalyst, the amounts of the diepoxide and dicarboxylic acid being chosen so that 1.04 to 1.4 carboxyl groups of the dicarboxylic acid are present per epoxide group of the diepoxide, are suitable for the production of crosslinked products, in particular as adhesives or for the production of flexible coatings.

7 Claims, No Drawings

POLYHYDROXY ESTERS CONTAINING CARBOXYL END GROUPS AND THEIR USE

The invention relates to certain polyhydroxy esters containing carboxyl end groups which are obtainable by reaction of diepoxides with dicarboxylic acids, certain mixtures of these compounds, a process for their preparation and their use, in particular as components of curable epoxy resin compositions of matter.

The use of compounds containing several carboxyl groups, such as polycarboxylic acids or polyesters having carboxyl end groups, as curing agents for epoxy resins is known. Such compositions of matter are employed, for example, as powder varnishes and are described, for example, in U.S. Pat. Nos. 4,175,173, 4,147,737 or 3,397,254.

It has now been found that epoxy resin compositions of matter having particularly good properties are obtained if certain polyhydroxy esters containing carboxyl end groups are used as curing agents.

The invention relates to curable compositions of matter containing
(a) an epoxy resin and
(b) a polyhydroxy ester containing carboxyl end groups which is obtainable by reaction of a diepoxide with a dicarboxylic acid in the presence of a basic catalyst, the amounts of the diepoxide and dicarboxylic acid being chosen so that 1.04 to 1.4 carboxyl groups of the dicarboxylic acid are present per epoxide group of the diepoxide.

The amounts of components (a) and (b) of the compositions of matter according to the invention are preferably chosen so that 0.15 to 1 carboxyl group, in particular 0.3 to 1 carboxyl group, of the polyhydroxy ester (b) is present per epoxide group of the epoxy resin (a). During curing, both the carboxyl groups and the hydroxyl groups of the polyester containing carboxyl end groups can in this case react with the epoxy resin.

Any compound customary in the art of epoxy resins can on principle be employed as component (a) in the compositions of matter. Epoxy resins having on average more than two epoxide groups per molecule are preferred.

Examples of epoxy resins are:

I) Polyglycidyl esters and poly-($\beta$-methylglycidyl) esters which are obtainable by reaction of a compound having at least two carboxyl groups in the molecule and epichlorohydrin or $\beta$-methyl-epichlorohydrin. The reaction is advantageously carried out in the presence of bases.

Aliphatic polycarboxylic acids can be used as compounds having at least two carboxyl groups in the molecule. Examples of such polycarboxylic acids are oxalic acid, succinic acid, glutaric acid, adipic acid, pimelic acid, suberic acid, azelaic acid or dimerized or trimerized linoleic acid.

However, it is also possible to employ cycloaliphatic polycarboxylic acids, for example tetrahydrophthalic acid, 4-methyltetrahydrophthalic acid, hexahydrophthalic acid or 4-methylhexahydrophthalic acid.

Aromatic polycarboxylic acids, for example phthalic acid, isophthalic or terephthalic acid, can furthermore be used.

II) Polyglycidyl ethers or poly($\beta$-methylglycidyl) ethers which are obtainable by reaction of a compound having at least two free alcoholic hydroxyl groups and/or phenolic hydroxyl groups and a suitably substituted epichlorohydrin under alkaline conditions, or in the presence of an acid catalyst with subsequent treatment with an alkali.

Ethers of this type are derived, for example, from acyclic alcohols, such as ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol, and from polyepichlorohydrins.

However, they are also derived, for example, from cycloaliphatic alcohols, such as 1,4-cyclohexanedimethanol, bis(4-hydroxycyclohexyl)methane or 2,2-bis(4-hydroxycyclohexyl)propane or they have aromatic nuclei, such as N,N-bis(2-hydroxyethyl)-aniline or p,p'-bis(2-hydroxyethylamino)diphenylmethane.

The epoxide compounds can also be derived from mononuclear phenols, for example from resorcinol or hydroquinone; or they are based on polynuclear phenols, for example bis(4-hydroxyphenyl)methane, 4,4'-dihydroxybiphenyl, bis(4-hydroxyphenyl) sulfone, 1,1,2,2-tetrakis-(4-hydroxyphenyl)ethane, 2,2-bis(4-hydroxyphenyl)propane or 2,2-bis(3,5-dibromo-4-hydroxyphenyl)propane, or on novolaks obtainable by condensation of aldehydes, such as formaldehyde, acetaldehyde, chloral or furfuraldehyde, with phenols, such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols, as described above.

III) Poly(N-glycidyl) compounds which are obtainable by dehydrochlorination of the reaction products of epichlorohydrin with amines containing at least two amine hydrogen atoms. These amines are, for example, aniline, n-butylamine, bis(4-aminophenyl)methane, m-xylylenediamine or bis(4-methylaminophenyl)methane.

However, the poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives which are derived from dithiols, for example ethane-1,2-dithiol or bis(4-mercaptomethylphenyl) ether.

V) Cycloaliphatic epoxy resins, for example bis(2,3-epoxycyclopentyl) ether, 2,3-epoxycyclopentylglycidyl ether, 1,2-bis(2,3-epoxycyclopentyloxy)ethane, 3,4-epoxycyclohexylmethyl-3',4'-epoxycyclohexane carboxylate or bis(3,4-epoxycyclohexylmethyl) esters of aliphatic dicarboxylic acids, such as bis(3,4-epoxycyclohexylmethyl) adipate.

However, epoxy resins in which the 1,2-epoxide groups are bonded to different hereto atoms or functional groups can also be used; these compounds include, for example, the N,N-O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Epoxy resins which have an epoxide content of 2 to 10 equivalents/kg and which are glycidyl ethers, glycidyl esters or N-glycidyl derivatives of aromatic, heterocyclic, cycloaliphatic or aliphatic compounds are preferably used.

Particularly preferred epoxy resins are polyglycidyl ethers of bisphenols, for example of 2,2-bis(4-hydroxyphenyl)propane (bisphenol A) or bis(4-hydroxyphenyl)methane (bisphenol F), or of novolaks which are formed by reaction of formaldehyde with a phenol, or glycidyl derivatives of the abovementioned heterocyclic compounds, in particular triglycidyl isocyanurate.

The polyhydroxy esters containing carboxyl end groups to be used as component (b) of the curable compositions of matter according to the invention are viscous to solid thermoplastic polyesters which are soluble in polar organic solvents and contain both hydroxyl groups and carboxyl groups, and which are still new in some cases.

They can be prepared by reaction of a diepoxide with a dicarboxylic acid in the stoichiometric ratio of 1:1.04 to 1.4 in the presence of a basic catalyst. The reaction can be illustrated by the example of the reaction of a diglycidyl ether as follows:

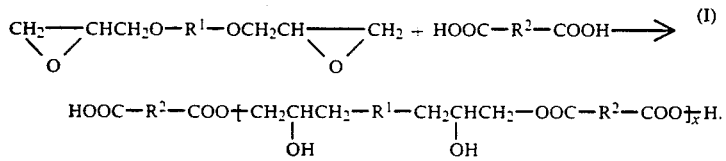

$$HOOC-R^2-COO \!+\! CH_2CHCH_2-R^1-CH_2CHCH_2-OOC-R^2-COO \!+\!_x H.$$
$$\phantom{HOOC-R^2-COO+CH_2CHCH_2-R^1-CH_2CH}\!|\phantom{CH_2-OOC-R^2-COO+}\!|$$
$$\phantom{HOOC-R^2-COO+CH_2CHCH_2-R^1-CH_2}OH\phantom{CH_2-OOC-R^2-COO}OH$$

In addition to the linear structure shown above for the polyhydroxy ester containing carboxyl end groups, branched polymers formed by etherification of the resulting secondary hydroxyl groups with the as yet unreacted epoxide groups are also obtained in the synthesis.

As mentioned, the excess of dicarboxylic acid in the reaction with the diepoxide must be chosen so that 1.04 to 1.4 carboxyl groups are present per epoxide group. If the excess is less than defined, premature gelling or formation of an insoluble product occurs; on the other hand, if the excess is too high products of adequately high molecular weight cannot be obtained.

The synthesis can be carried out either in a suitable solvent or, preferably, in the melt. Examples of suitable solvents are tetrahydrofuran, dioxane, toluene and methyl ethyl ketone.

Examples of suitable basic catalysts are alkali metal hydroxides, such as NaOH or KOH, or organic bases, such as, in particular, nitrogen-containing heterocyclic compounds or tertiary amines. Examples of suitable catalysts are triethylamine, benzyldiethylamine, benzyldimethylamine, tri-n-butylamine, triisopropanolamine, N,N-dimethylacetamide and imidazole.

The reaction is appropriately carried out at elevated temperature, for example in the range from about 100° to 200° C., preferably in the melt. For the reaction, the dicarboxylic acid is preferably initially introduced into the reaction vessel and the diepoxide compound is added over a suitable time span, for example over 30 minutes. In addition to the diepoxide and the dicarboxylic acid, smaller amounts, for example up to 5 mol %, of the corresponding trifunctional compounds can be also be employed in the synthesis of the polyhydroxy esters as long as soluble polymers are still obtained by the process. The amount of basic catalyst used in the reaction can vary according to the nature of the catalyst. Amounts of about 0.1-1% by weight, preferably 0.2-0.3% by weight, based on the total amount of educts, have proved suitable when tertiary amines are used. The reaction is in general continued until the carboxyl content of the polyhydroxy ester remains constant.

The polyhydroxy esters containing carboxyl end groups thus prepared preferably have a molecular weight (gel permeation chromatography in tetrahydrofuran) $\overline{M}_n$ of 1000 to 4000, in particular 1500 to 3700, an $\overline{M}_w/\overline{M}_n$ of 3 to 8, in particular 3.5 to 6.5, a carboxyl group content of 0.3 to 2.5, in particular 0.4 to 1.5 equivalents/kg and a glass transition temperature in the range from $-20°$ to $50°$, in particular $-15°$ to $30°$ C., or a melting point in the range from $10°$ to $80°$, in particular $20°$ to $60°$ C.

It is surprising that it was possible to synthesize the polyhydroxy esters of the type defined containing carboxyl end groups as soluble thermoplastic polymers at all. Although some literature references describe the reaction of diepoxides with dicarboxylic acids, in general they report that isolation of soluble polymers is not possible because gelled, insoluble products are as a rule already formed before complete reaction of the educts.

As a rule at most equimolar amounts of dicarboxylic acids are reacted with diepoxides in the reactions previously described in this context.

Matejka et al. in Makromol. Chem. 186, 2025 (1985) and Härtel et al. in Plaste und Kautschuk, 31, 405 (1984) investigated the reaction of equimolar amounts of bisphenol A diglycidyl ether with aliphatic dicarboxylic acids in the melt and came to the conclusion that gelling starts before complete reaction of the carboxyl groups, or that it is impossible to interrupt the reaction before the gelling point is reached and to isolate a soluble addition product of high molecular weight.

U.S. Pat. No. 3,535,289 describes the reaction of diglycidyl esters with less than to at most equimolar amounts of dicarboxylic acids, polyesters containing epoxide end groups, i.e. prelengthened epoxy resins, which can be crosslinked with the usual curing agents for epoxy resins, resulting. According to this literature reference, a reaction with more than the equimolar amounts of dicarboxylic acid leads to undesirable three-dimensional crosslinked products.

The reaction of diepoxides, in particular of diglycidyl ethers, with less than the equimolar amounts of dicarboxylic acid is also described in U.S. Pat. No. 3,256,226, the polyesters containing epoxide end groups thus prepared subsequently being end-blocked with olefinically unsaturated monocarboxylic acids. This gives polymers having terminal unsaturated groups which can be further polymerized via these reactive double bonds or processed with suitable unsaturated comonomers to give copolymers.

U.S. Pat. No. 3,639,655 states that although in general hydroxyl-substituted polyesters can be prepared by reaction of dicarboxylic acids with epoxy resins, as a rule considerable problems arise because of gelling of the products. According to this literature reference, these problems can be avoided if the reaction of essentially equimolar amounts of diglycidyl and dicarboxylic acids is carried out in aprotic polar organic solvents. In Comparison Example IX it is shown that if non-polar xylene is used as the solvent, only a gelled crosslinked polymer is obtained. The soluble polyhydroxy esters prepared in polar solvents can be crosslinked by heating with polyisocyanates or anhydrides. The use of these polyhydroxy esters in thermoplastic adhesives which can be activated by heat is described in U.S. Pat. No. 4,430,479.

Surprisingly, it has now been found that if the excess defined above of dicarboxylic acids is used, diepoxides can be converted without problems into soluble polyhydroxy esters containing carboxyl end groups, regardless of whether the reaction is carried out in solution or in the melt.

In J. Poly. Sci. A-1, volume 7,2117 (1969), F. B. Alvey describes an investigation into the epoxide/carboxylic acid reaction with the aid of model reactions. Polyhydroxy ester polymers are also prepared from bisphenol A diglycidyl ether and adipic acid by this reaction. Although most polymers were prepared from equimolar amounts of the educts, a polyhydroxy ester containing carboxyl end groups (polymer P-5) which was obtained by reaction of 0.95 mol of bisphenol A diglycidyl ether with 1 mol of adipic acid is also described. In this example, the reaction is carried out in a two-stage process at 125° C. over a total of 7 hours and is interrupted shortly before gelling occurs. At this temperature, the adipic acid is not yet molten (melting point 155° C.), so that a heterogeneous reaction takes place. This leads to non-uniform products, since the epoxide groups have an increased possibility of homopolymerization.

The use of polyhydroxy esters as curing agents for epoxy resins is not known.

The polyhydroxy ester component (b) of the curable compositions of matter according to the invention is preferably prepared by reaction of diepoxides, selected from (b1) diglycidyl ethers, (b2) diglycidyl esters and (b3) cycloaliphatic epoxy resins, with a dicarboxylic acid having 2-40 carbon atoms.

Suitable diepoxides (b1), (b2) and (b3) are the compounds described above as suitable epoxy resins.

Any known dicarboxylic acid which contains no other functional groups which can react with the epoxide groups, apart from the carboxyl groups, can on principle be employed as the dicarboxylic acid. Aliphatic, cycloaliphatic or aromatic dicarboxylic acids can be employed. Acids which are obtained by dimerization of naturally occurring long-chain unsaturated fatty acids are also suitable, for example $C_{36}$dimeric acid. Examples of suitable dicarboxylic acids are phthalic acid, isophthalic acid, terephthalic acid, oxalic acid, succinic acid, glutaric acid, adipic acid, pimelic acid, suberic acid, azelaic acid, sebacic acid, dodecanedioic acid, tetradecanedioic acid, eicosanedioic acid, hexahydrophthalic acid and cyclopentanedicarboxylic acid. Acids of relatively low melting point, for example below about 160° C., are in general preferred.

Particularly preferred diepoxides are diglycidyl ethers of bisphenol A or of neopentylglycol, diglycidyl esters of hexahydrophthalic acid, of phthalic acid, of terephthalic acid, of adipic acid or of sebacic acid, 3,4-epoxycyclohexylmethyl-3',4'-epoxycyclohexane carboxylate and bis(3,4-epoxycyclohexylmethyl) adipate. Particularly preferred dicarboxylic acids are adipic acid, sebacic acid, dodecanedioic acid, tetradecanedioic acid, suberic acid and eicosanedioic acid.

The polyhydroxy esters (b) can also be prepared by reaction of a mixture of two or more of the diepoxides (b1), (b2) or (b3).

The curable epoxy resin compositions of matter according to the invention are suitable for the production of crosslinked products. For this, the compositions can also contain other curing agents or curing accelerators customary in the art of epoxy resins and other customary additives, in addition to the polyhydroxy ester (b).

The compositions according to the invention can furthermore contain as other customary additives plasticizers, extenders, fillers and reinforcing agents, for example, coal tar, bitumen, textile fibres, glass fibres, asbestos fibres, boron fibres, carbon fibres, mineral silicates, mica, quartz flour, hydrated aluminium oxide, bentonites, wollastonite, kaolin, silicic acid aerogel or metal powders, for example aluminium powder or iron powder, and furthermore pigments and dyes, such as carbon black, oxide colours and titanium dioxide, flameproofing agents, thixotropic agents, flow control agents, such as silicones, waxes and stearates, some of which are also used as mould release agents, adhesion promoters, antioxidants and light stabilizers.

The compositions of matter are preferably cured at elevated temperature, for example between about 100° and 250° C., in particular between about 150° and 200° C.

The compositions according to the invention can be used, for example, as adhesives, adhesive films, patches, matrix resins, varnishes or sealing compounds, or quite generally for the production of cured products. They can in each case be used in the formulation appropriate for the specific field of use, in the non-filled or filled state, for example as paints, coating compositions, varnishes, pressing compositions, dipping resins, casting resins, impregnating resins, laminating resins, matrix resins and adhesives.

The invention also relates to the use of the compositions according to the invention for the preparation of adhesives or coating compositions.

The curable compositions of matter are especially suitable for the preparation of adhesives, in particular as one-component melt adhesives or one-component pressure-sensitive melt adhesives. Triglycidyl isocyanurate is particularly suitable here as the epoxy resin component (a).

Non-crystalline polyhydroxy esters (for example of diglycidylhexahydrophthalate and saturated aliphatic dicarboxylic acids having 6–10 C atoms or diglycidyl terephthalate and sebacic acid) can be formulated with triglycidyl isocyanurate ((TGIC) to give pressure-sensitive melt adhesives, i.e. these mixtures are tacky before hardening and in this way facilitate joining together of the components. The tackiness of these compositions is ensured for at least 3 weeks at room temperature. The pressure-sensitive melt adhesives can in some cases be used for bonding at room temperature or elevated temperature and are so tacky on cooling that the bonded components do not have to be fixed immediately by clamps or the like. Final curing is then carried out for example at 180° C. The pressure-sensitive melt adhesives are very flexible after hardening and nevertheless have a high adhesive strength.

Crystalline polyhydroxy esters (for example of bisphenol A diglycidyl ether and eicosanedioic acid) give, with TGIC, melt adhesives of, for example, melting point 50°–70° C., very good adhesive strength and adhesion after hardening in spite of a high flexibility, and very good resistance to hydrolysis.

The adhesives described above are distinguished by a surprisingly good adhesion, including to oiled steel, in spite of their high flexibility. Good adhesion is otherwise to be achieved with flexible adhesives only with difficulty.

The coatings produced with the curable compositions of matter according to the invention are also distinguished by particularly good properties, in particular by a high flexibility and very good adhesion.

The present invention also relates to polyester compositions of matter containing at least two different polyhydroxy esters containing carboxyl end groups defined above. For some applications, the use of such compositions as component (b) provides certain advantages, since the properties of the cured product can be tailor-made in this way, for example by combination of a polyhydroxy ester which imparts more tackiness with a polyhydroxy ester which imparts more strength. Such polyester compositions of matter can be prepared either by mixing the individual polyhydroxy esters together or by reaction of more than one diepoxide with one or more dicarboxylic acids or by reaction of more than one dicarboxylic acid with one or more diepoxides.

Polyester compositions of matter which contain (i) a reaction product of a diglycidyl ether (b1) or of a cycloaliphatic epoxy resin (b3) with a dicarboxylic acid and (ii) a reaction product of a diglycidyl ester (b2) with a dicarboxylic acid have proved to be particularly advantageous. The use of such mixtures as component (b) of the curable compositions of matter results in pressure-sensitive melt adhesives of particularly high tensile shear strength.

The invention furthermore relates to polyhydroxy esters containing carboxyl end groups which are obtainable by reaction of a diepoxide selected from (b2) diglycidyl esters and (b3) cycloaliphatic epoxy resins with a dicarboxylic acid in the presence of a basic catalyst, the amounts of the diepoxide and dicarboxylic acid being chosen so that 1.04 to 1.4 carboxyl groups of the dicarboxylic acid are present per epoxide group of the diepoxide, and to a process for their preparation. As explained above, the reaction is preferably carried out in the melt in the presence of a tertiary amine as the catalyst. In the reaction of cycloaliphatic epoxy resins, 1.2 to 1.3 mol of dicarboxylic acid are preferably employed per mol of diepoxide.

In addition to the use described above for the polyhydroxy esters (b) in the curable compositions of matter, the polyhydroxy esters containing carboxyl end groups according to the invention and the polyester compositions of matter according to the invention containing at least two different polyhydroxy esters containing carboxyl end groups can be used as such as binders for the preparation of adhesives or for the production of coverings or shaped articles. They can moreover also be employed as crosslinking agents for compounds which contain functional groups which can react with the hydroxyl or carboxyl groups of the polyhydroxy ester.

The following examples illustrate the invention.

EXAMPLES

A. Preparation of the polyhydroxy ester containing carboxyl end groups

The dicarboxylic acid is melted at 130°–160° C. (depending on the melting point) in a sulfonating flask with a stirrer and thermometer. When the acid has melted, the catalyst is added (0.25% by weight of benzyldimethylamine). The epoxy compound is added in small portions. During this addition, the oil bath temperature is reduced slowly to 130° C. The reaction is continued until the COOH content remains constant. The polyhydroxy ester can be reprecipitated, for example, from acetone/hexane or tetrahydrofuran/hexane.

The products thus prepared are viscous to solid, amorphous or crystalline substances which are soluble in polar organic solvents and have a Tg [differential scanning calorimetry on a Mettler TA 3000 at 10° C./minute] of $-20°$ to 50° C. or a melting point, m.p. of 10°–80° C., a COOH content of 0.3–2.5 equivalents/kg, an acid number of 10 to 130 mg of KOH/g, a molecular weight (gel permeation chromatography in tetrahydrofuran) $\overline{M}_n$ of 1000–4000 and an $\overline{M}_w/\overline{M}_n$ of 3–8.

The following diepoxides and dicarboxylic acids are used in the preparation of the polyhydroxy esters containing carboxyl end groups:

a) Diepoxides

BADGE1: Bisphenol A diglycidyl ether (crystalline) having an epoxide content of 6.06 equivalents/kg BADGE2: A solid bisphenol A epoxy resin having an epoxide content of 2.62 equivalents/kg HHDGE: Hexahydrophthalic acid diglycidyl ester having an epoxide content of 6.96 equivalents/kg TDGE: Terephthalic acid diglycidyl ester having an epoxide content of 7.19 equivalents/kg ADGE: Adipic acid diglycidyl ester having an epoxide content of 7.74 equivalents/kg PDGE: Phthalic acid diglycidyl ester having an epoxide content of 7.19 equivalents/kg NPDGE: Neopentylglycol diglycidyl ether having an epoxide content of 7.32 equivalents/kg EPCH1: 3,4-Epoxycyclohexylmethyl-3',4'-epoxycyclohexane carboxylate having an epoxide content of 7.21 equivalents/kg EPCH2: Bis(3,4-epoxycyclohexylmethyl) adipate having an epoxide content of 5.00 equivalents/kg b) Dicarboxylic acids AA: Adipic acid
DDDA: Dodecanedioic acid
TDDA: Tetradecanedioic acid
SEA: Sebacic acid
EDA: Eicosanedioic acid
SUA: Suberic acid

EXAMPLE 1 (BADGE1/AA)

24.3 g (0.33 equivalent of COOH) of adipic acid are melted at 165° C. (oil bath temperature) in a 200 ml sulfonating flask with a stirrer and thermometer, and 0.19 ml of benzyldimethylamine is added. 50 g of BADGE1 (0.3 equivalent of epoxide) are added in small portions in the course of 30 minutes. During this period, the temperature of the oil bath is reduced slowly to 130° C.

After a reaction time of 160 minutes, the content of COOH end groups is 0.99 equivalent/kg; Tg 24°–38° C.

EXAMPLE 2 (HHDGE/DDDA)

60.38 g of dodecanedioic acid (0.52 equivalent of COOH) are melted at 130° C. in a sulfonating flask with a stirrer and thermometer, and 0.33 ml of benzyldimethylamine is added. 72 g of hexahydrophthalic acid diglycidyl ester (0.51 equivalent of epoxide) are added. The reaction is complete after 2 hours at 130° C.

Content of COOH groups in the impure product:

0.44 equivalent/kg; Tg −11°-1° C.

EXAMPLE 3 (TDGE/TDDA)

61.6 g of tetradecanedioic acid (0.48 equivalent of COOH) are melted at 140° C. in a sulfonating flask with a stirrer and thermometer. 0.31 ml of benzyldimethylamine is added, and 63.25 g of terephthalic acid diglycidyl ester (0.455 equivalent of epoxide) are slowly added. After the addition, the temperature of the oil bath is reduced to 130° C. After 180 minutes, no further free epoxide groups are detectable, after which the reaction is interrupted. Content of COOH end groups in the impure product: 0.63 equivalent/kg; Tg 14°-22° C.

EXAMPLES 4-31

The following polyhydroxy esters containing carboxyl end groups are prepared as described above:

After hardening: very flexible transparent to cloudy films of Tg 0°-30° C., Erichsen cupping of layers 75 μm thick <10 mm; very good adhesion to degreased and oiled steel; tensile shear strength up to 17 MPa, which is very high for such flexible products.

B.1. Preparation of pressure-sensitive melt adhesives and their use

EXAMPLE 32

2 g of acid polyhydroxy ester of HHDGE and adipic acid, prepared according to Example 4, and 2.5 g of acid polyhydroxy ester of BADGE1 and dodecanedioic acid, prepared according to Example 11, are mixed with 0.39 g of TGIC at 110° C. On cooling, a cloudy, highly viscous, tacky mass is formed. The tackiness persists for at least 3 weeks at room temperature.

Gluing to oiled steel at 110° C.

| Ex-ample | Starting substances | Equivalents of COOH / Equivalents of epoxide | Polyhydroxy ester COOH (Equivalents/kg) | $\overline{M}_n$ | $\overline{M}_w$ | Tg or (m.p.) °C. |
|---|---|---|---|---|---|---|
| 4 | HHDGE/AA | 1.05 | 1.10 | 2600 | 10500 | −15--−3 |
| 5 | HHDGE/SEA | 1.05 | 0.77 | 2500 | 16600 | −9--−1 |
| 6 | HHDGE/DDDA | 1.05 | 0.44 | 3100 | 12800 | −11--−1 |
| 7 | HHDGE/TDDA | 1.05 | 0.43 | 3700 | 12700 | (18) |
| 8 | HHDGE/EDA | 1.05 | 0.30 | 3500 | 21000 | (61) |
| 9 | BADGE1/AA | 1.09 | 0.99 | 1900 | 14900 | 24-38 |
| 10 | BADGE1/SEA | 1.10 | .070 | — | — | 10-18 |
| 11 (11A) | BADGE1/DDDA | 1.05 (1.10) | 0.52 | 2900 | 20500 | 10-19 |
| 12 (12A) | BADGE1/EDA | 1.05 (1.20) | 0.69 | 2700 | 16800 | (59) |
| 13 | TDGE/AA | 1.05 | 0.71 | 2300 | 29500 | 14-22 |
| 14 | TDGE/SEA | 1.05 | 1.44 | 1600 | 5000 | 2-8 |
| 15 | TDGE/DDDA | 1.05 | 1.05 | 3700 | 11700 | (54) |
| 16 | TDGE/TDDA | 1.05 | 0.63 | 3000 | 9200 | (75) |
| 17 | HHDGE/BADGE1/DDDA (1.35/0.56/1.59 parts by weight) | 1.08 | 1.66 | 1500 | 5400 | −21--−12 (45,55) |
| 18 | HHDGE/BADGE1/AA/DDDA (1.62/0.56/0.87/0.44 parts by weight) | 1.07 | 1.36 | 1600 | 5600 | −15--−6 |
| 19 | HHDGE/BADGE1/SEA/DDDA (1.43/0.56/1.07/0.44 parts by weight) | 1.12 | 2.21 | 1000 | 3100 | −23--−13 (46) |
| 20 | BADGE2/DDDA | 1.10 | 0.51 | 3600 | 19500 | 38-44 |
| 21 | BADGE2/SUA | 1.10 | 0.53 | 5000 | 17100 | 47-56 |
| 22 | ADGE/AA | 1.10 | 1.10 | 1000 | 4600 | −33--−24 |
| 23 | ADGE/DDDA | 1.05 | 0.88 | 2100 | 7400 | (12,9) |
| 24 | PDGE/AA | 1.10 | 1.94 | 1800 | 4300 | 10-21 |
| 25 | PDGE/SEA | 1.05 | 0.70 | 2500 | 9600 | −8-2 |
| 26 | PDGE/DDDA | 1.05 | 0.55 | 2900 | 14400 | −11--−2 |
| 27 | PDGE/TDDA | 1.05 | 0.70 | 2700 | 11700 | (22) |
| 28 | EPCH1/DDDA | 1.20 | 1.28 | 2300 | 18700 | 4-19 |
| 29 | EPCH1/AA | 1.20 | 1.59 | 1500 | 14600 | 28-41 |
| 30 | NPDGE/AA | 1.10 | 1.71 | 2200 | 8700 | −31--−21 |
| 31 | EPCH2/AA | 1.20 | 1.52 | 2400 | 42600 | 23-34 |

B. Curable compositions of matter consisting of polyhydroxy esters containing carboxyl end groups and triglycidyl isocyanurate (TGIC)

Before hardening, the compositions of matter are very viscous (Tg −10°-20° C.), tacky or solid mixtures (m.p. up to 70° C.) and have a good storage stability at room temperature (decrease in the residual enthalpy by not more than half within 2 weeks; many formulations shown an even lower decrease).

The tacky formulations retain their tackiness for at least 3 weeks at room temperature; these mixtures can be applied at room temperature to elevated temperature and after cooling adhere very firmly to Al and degreased steel.

Tensile shear strength (DIN 53283) after hardening (30 minutes, 180° C.): 15 MPa; after storage in water at room temperature for 2 weeks: 12.5 MPa.

Tg after hardening: 17°-25° C.

EXAMPLES 33

2.5 g of acid polyhydroxy ester of HHDGE and TDDA, prepared according to Example 7, and 1 g of acid polyhydroxy ester of BADGE1/DDDA, prepared according to Example 11, are mixed with 0.17 g of TGIC. On cooling, a clear, highly viscous, tacky mass is formed, which retains it tackiness for at least 3 weeks at room temperature.

Gluing to oiled steel at 110° C.

Tensile shear strength (DIN 53283) after hardening (30 minutes, 180° C.): 6 MPa; after storage in water at room temperature for 2 weeks: 1.5 MPa.

Tg after hardening: 1°–9° C.

EXAMPLE 34

2.5 g of acid polyhydroxy ester of terephthalic acid diglycidyl ester and sebacic acid, prepared according to Example 14, are mixed with 0.38 g of TGIC at 110° C. On cooling, a clear, highly viscous, tacky mass is formed, which retains its tackiness for at least 3 weeks at room temperature.

Tensile shear strength (DIN 53283) after hardening (30 minutes, 180° C.): 11 MPa; after storage in water at room temperature for 2 weeks: 6.9 MPa.

Tg after hardening: 16°–26° C.

EXAMPLES 35–44

The following pressure-sensitive melt adhesive formulations are prepared as described above, cured at 180° C. for 30 minutes and tested.

Gluing to oiled steel: the formulation is melted at 110° C. and applied to sheets of oiled steel and the system is glued and cured at 180° C. for 30 minutes.

Tensile shear strength (DIN 53283) after curing: 14.7 MPa

Tensile shear strength after storage in water at room temperature for 2 weeks: 8 MPa Tg of the hardened formulation: 17°–27° C.

EXAMPLE 43

5 g of polyhydroxy ester of HHDGE/tetradecanedioic acid, prepared according to Example 7, and 5 g of acid polyhydroxy ester of BADGE1/eicosanedioic acid, prepared according to Example 12, are mixed with 0.68 g of TGIC at 110° C. On cooling, a solid, non-tacky mass of melting point 54° C. is formed. Gluing to oiled steel: the formulation is melted at 110° C. and applied to sheets of oiled steel and the system is glued and cured at 180° C. for 30 minutes.

Tensile shear strength (DIN 53283) after curing: 10.2 MPa

| | | | Tensile shear strength (DIN 53283) | |
|---|---|---|---|---|
| Example | Formulation | Tg (°C.) | immediately after curing (MPa) | after storage in water at room temperature for 2 weeks (MPa) |
| 35 | 2.50 g of product from Example 4<br>2.50 g of product from Example 11A<br>0.39 g of TGIC | 7–24 | 15.0 (70% K[1]) | 12.5 (100% A[2]) |
| 36 | 2.50 g of product from Example 4<br>1.00 g of product from Example 11A<br>0.31 g of TGIC | 17–24 | 17.0 (70% K[1]) | 9.2 (100% A[2]) |
| 37 | 2.50 g of product from Example 7<br>1.00 g of product from Example 11A<br>0.17 g of TGIC | 1–9 | 6.0 (90% A[2]) | 1.5 (100% A[2]) |
| 38 | 2.50 g of product from Example 14<br>0.38 g of TGIC | 16–26 | 11.0 (90% A[2]) | 6.9 (100% A[2]) |
| 39 | 2.50 g of product from Example 18<br>0.36 g of TGIC | 18–26 | 15.7 (50% K[1]) | — |
| 40 | 2.50 g of product from Example 19<br>0.59 g of TGIC | 9–21 | 10.8 (40% K[1]) | — |
| 41 | 5.00 g of product from Example 27<br>0.38 g of TGIC | −4–4 | 2.5 (70% K[1]) | 2.3 (70% A[2]) |

[1]Cohesive fracture
[2]Adhesive fracture

B.2. Preparation of melt adhesives and their use

EXAMPLE 42

19.1 g of acid polyhydroxy ester from BADGE1/dodecanedioic acid, prepared according to Example 11, are mixed with 1.16 g of TGIC at 110° C. so that a homogeneous, clear solution is formed. On cooling, a solid, non-tacky mass having a Tg of 5°–17° C. is formed.

Tensile shear strength after storage in water at room temperature for 2 weeks: 6.6 MPa Tg of the hardened formulation: −10°–17° C.

m.p. of crystalline portions: 41° C.

EXAMPLES 44–53

The following melt adhesive formulations are prepared as described above and tested before and after curing (30 minutes at 180° C.).

| | | m.p. or Tg (°C.) before/after curing | | Appearance after curing | Tensile shear strength (DIN 53283) (MPa) | |
|---|---|---|---|---|---|---|
| Example | Formulation | | | | immediately after curing | after storage in water for 2 weeks |
| 44 | 5.00 g of product from Example 8<br>0.16 g of TGIC | m.p.<br>60 | m.p.<br>40–50 | flexible, cloudy | 6.8 (50% A[1]) | 6.8 (50% A[1]) |

-continued

| Example | Formulation | m.p. or Tg (°C.) before/after curing | | Appearance after curing | Tensile shear strength (DIN 53283) (MPa) | |
|---|---|---|---|---|---|---|
| | | | | | immediately after curing | after storage in water for 2 weeks |
| 45 | 19.10 g of product for Example 11<br>1.16 g of TGIC | Tg 5–17 | Tg 17–27 | flexible, cloudy | 14.7 (80% A[1]) | 8.0 (100% A[1]) |
| 46 | 13.2 g of product for Example 12A<br>1.16 g of TGIC | m.p. 56 | m.p. 20,48 | flexible, clear | 15.3 (80% A[1]) | 16.2 (100% A[1]) |
| 47 | 5.00 g of product for Example 8<br>5.00 g of product from Example 12A<br>0.53 g of TGIC | Tg −8–3 | Fp 38 | flexible, clear | 9.7 (80% A[1]) | 8.5 (100% A[1]) |
| 48 | 5.00 g of product for Example 7<br>5.00 g of product from Example 12A<br>0.68 g of TGIC | m.p. 54 | m.p.41<br>Tg −12–17 | flexible, slightly cloudy | 10.2 (100% A[1]) | 6.6 (100% A[1]) |
| 49 | 5.00 g of product for Example 4<br>5.00 g of product from Example 12A<br>0.93 g of TGIC | m.p. 54 | m.p.46<br>Tg 5–15 | flexible, cloudy | 6.7 (50% K[2]) | 5.8 (100% A[1]) |
| 50 | 5.00 g of product for Example 5<br>5.00 g of product from Example 12A<br>0.89 g of TGIC | Tg −11–0 | m.p. 47 | — | 5.0 (50% K[2]) | — |
| 51 | 5.00 g of product for Example 24<br>0.51 g of TGIC | — | Tg 23–29 | — | 15.0 (50% K[2]) | 6.5 (80% A[1]) |
| 52 | 5.00 g of product for Example 28<br>0.71 g of TGIC | — | Tg 17–32 | — | 15.9 (50% K[2]) | 13.7 (80% A[1]) |
| 53 | 5.00 g of product for Example 29<br>0.86 g of TGIC | — | Tg 57–59 | — | 13.0 (80% A[1]) | 12.5 (100% A[1]) |

[1] Adhesive fracture
[2] Cohesive fracture

B.3. Production of coatings

EXAMPLE 54

The composition from Example 43 is melted at 110° C. and applied with the aid of a drawing triangle to an Al sheet so that a film 75 μm thick is formed. The film is cured at 180° C. for 30 minutes. The Erichsen cupping (DIN 53156) of the hardened film is more than 10 mm.

EXAMPLE 55

The composition from Example 32 is applied as a 75 μm thick film to an Al sheet as described in Example 54 and cured at 180° C. for 30 minutes. The Erichsen cupping (DIN 53156) of the hardened film is more than 10 mm.

EXAMPLES 55–60

Coatings are produced from the following compositions in a manner analogous to that described above and the Erichsen cupping is determined.

| Example | Composition from Example No. | Erichsen cupping (DIN 53156) |
|---|---|---|
| 56 | 35 | >10 mm |
| 57 | 36 | >10 mm |
| 58 | 46 | >10 mm |
| 59 | 48 | >10 mm |
| 60 | 50 | >10 mm |

C. Curable compositions of matter of polyhydroxy esters containing carboxyl end groups and a glycidyl derivative of bisphenol A, cresol novolak or dimainodiphenylmethane

EXAMPLE 61

5 g of the product from Example 20 are mixed with 0.46 g of BADGE1 at about 100° C. On cooling, a solid, non-tacky mass of Tg 38°–44° C. is formed.

Gluing to oiled steel: The formulation is melted at 110° C. and applied to sheets of oiled steel and the system is glued and cured at 180° C. for 30 minutes.

Tensile shear strength after curing: 18.2 MPa.
Tensile shear strength after storage in water at room temperature for 2 weeks: 15.8 MPa.
Tg of the hardened formulation: 50°–56° C.

EXAMPLE 62

5 g of product from Example 24 were mixed with 1.04 g of epoxy cresol novolak (4.6 epoxide equivalents/kg) at 100° C. On cooling, a solid, non-tacky mass of Tg 11°–21° C. is formed.

Gluing to oiled steel as described in Example 61.
Tensile shear strength after curing: 9.8 MPa.
Tensile shear strength after storage in water at room temperature for 2 weeks: 5.7 MPa.
Tg of the hardened formulation: 15°–27° C.

EXAMPLE 63

2.5 g of product from Example 4 and 2.5 g of product from Example 20 were mixed with 0.48 g of tetraglycidyldiaminodiphenylmethane at 100° C.

Gluing to oiled steel as described in Example 61.
Tensile shear strength after curing: 14.9 MPa
Tensile shear strength after storage in water at room temperature for 2 weeks: 13.3 MPa.
Tg of the hardened formulation: 24°–33° C.

What is claimed is:

1. A curable composition of matter containing
   (a) an epoxy resin and
   (b) a soluble thermoplastic polyhydroxy ester containing carboxyl end groups, which is obtained by reaction of a diepoxide with a dicarboxylic acid being chosen so that 1.04 to 1.4 carboxyl groups of the dicarboxylic acid are present per epoxide group of the diepoxide, and wherein component (b) has a molecular weight $M_n$ of 1000 to 4000, an $M_w/M_n$ of 3 to 8, a carboxyl group content of 0.3 to 2.5 equivalents/kg and a glass transition temperature in the range from −20° to 50° C. or a melting point in the range from 10° to 80° C.;
   in which the amounts of component (a) and (b) are chosen so that 0.15 to 1 carboxyl group of the polyester (b) is present per epoxide group of the epoxy resin (a).

2. A composition of matter according to claim 1, in which the amounts of components (a) and (b) are chosen so that 0.3 to 1 carboxyl group of the polyester (b) is present per epoxide group of the diepoxide.

3. A composition of matter according to claim 1, in which the epoxy resin (a) has an epoxide content of 2 to 10 equivalents/kg and is a glycidyl ether, glycidyl ester or N-glycidyl derivative of an aromatic, heterocyclic, cycloaliphatic or aliphatic compound.

4. A composition of matter according to claim 3, in which the epoxy resin (a) is triglycidyl isocyanurate.

5. A composition of matter according to claim 1, in which component (b) is prepared by reaction of a diepoxide, selected from (b1) diglycidyl ethers, (b2) diglycidyl esters and (b3) cycloaliphatic epoxy resins, with a dicarboxylic acid having 2–40 carbon atoms.

6. A composition of matter according to claim 5, in which (b1) is a diglycidyl ether of bisphenol A or of neopentylglycol, (b2) is a diglycidyl ester of hexahydrophthalic acid, of phthalic acid, of terephthalic acid, of adipic acid or of sebacic acid, (b3) is 3,4-epoxycyclohexylmethyl-3',4'-epoxycyclohexane carboxylate or bis(3,4-epoxycyclohexylmethyl) adipate and the dicarboxylic acid is adipic acid, sebacic acid, dodecanedioic acid, tetradecanedioic acid, suberic acid or eicosanedioic acid.

7. A composition of matter according to claim 5, in which component (b) is prepared by reaction of a mixture of two or more of the diepoxides (b1), (b2) and (b3).

* * * * *